United States Patent
Pope

(10) Patent No.: US 7,051,681 B2
(45) Date of Patent: May 30, 2006

(54) LAWN STAKE WITH CANINE SCENT ATTRACTANT

(75) Inventor: Susan Crawford Pope, Bedford, TX (US)

(73) Assignee: The Bramton Company, Irving, TX (US)

( * ) Notice: Subject to any disclaimer, the term of this patent is extended or adjusted under 35 U.S.C. 154(b) by 0 days.

(21) Appl. No.: 10/644,174

(22) Filed: Aug. 20, 2003

(65) Prior Publication Data

US 2005/0039698 A1    Feb. 24, 2005

(51) Int. Cl.
*A01K 15/02* (2006.01)
(52) U.S. Cl. ....................... 119/712; 119/711
(58) Field of Classification Search ............... 119/711, 119/161, 171, 905, 702, 712, 169; 43/131; 239/34, 57, 60, 53–55; 47/48.5
See application file for complete search history.

(56) References Cited

U.S. PATENT DOCUMENTS

| | | | | |
|---|---|---|---|---|
| 2,837,861 | A * | 6/1958 | Graham, Sr. ................. | 43/131 |
| 3,626,899 | A * | 12/1971 | Spellman ..................... | 119/169 |
| 4,263,873 | A | 4/1981 | Christianson | |
| 4,800,677 | A * | 1/1989 | Mack .......................... | 119/171 |
| 5,035,886 | A | 7/1991 | Chakrabarti et al. | |
| 5,058,533 | A | 10/1991 | Nelson | |
| 5,287,826 | A | 2/1994 | Mohamed | |
| 5,415,131 | A | 5/1995 | Dodman | |
| 5,914,119 | A | 6/1999 | Dawson | |
| 5,918,410 | A * | 7/1999 | Knuppel ....................... | 43/131 |
| 6,192,621 | B1 * | 2/2001 | Fain ............................. | 43/131 |
| 6,241,161 | B1 * | 6/2001 | Corbett ........................ | 239/58 |
| 6,276,300 | B1 | 8/2001 | Lewis, II et al. | |
| 6,531,145 | B1 * | 3/2003 | Reichert ....................... | 424/408 |

* cited by examiner

*Primary Examiner*—Son T. Nguyen
(74) *Attorney, Agent, or Firm*—Locke Liddell & Sapp LLP

(57) ABSTRACT

An article useful for attracting canines and inducing them to eliminate in a preferred outdoor area, the article desirably having a molded polymeric body and a canine attractant dispersed within the body, coated on a portion of the body or contained inside a cavity in the body, the canine attractant being adapted for release into the surrounding atmosphere over a prolonged period.

6 Claims, 3 Drawing Sheets

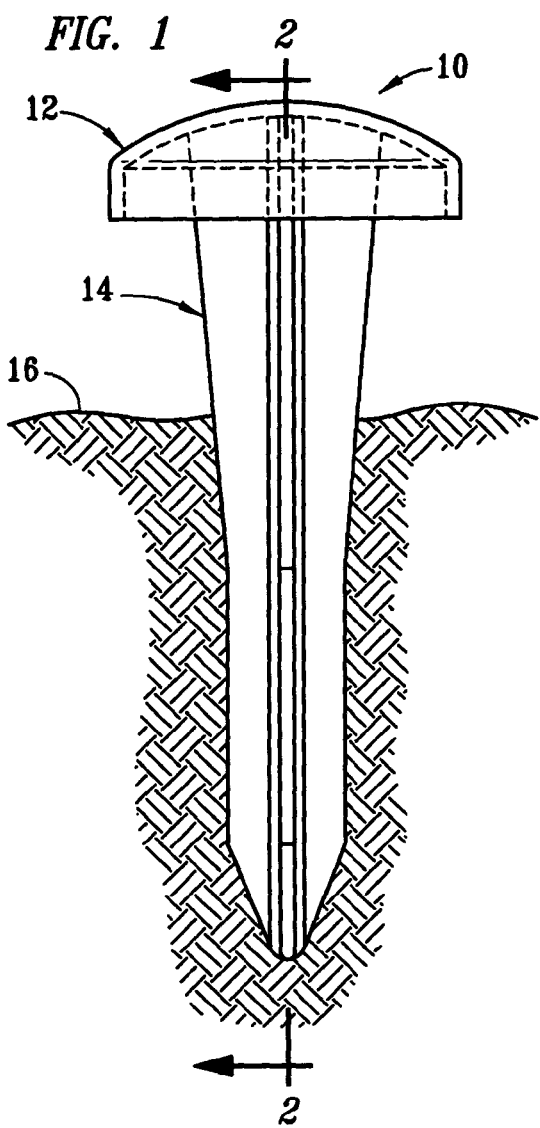
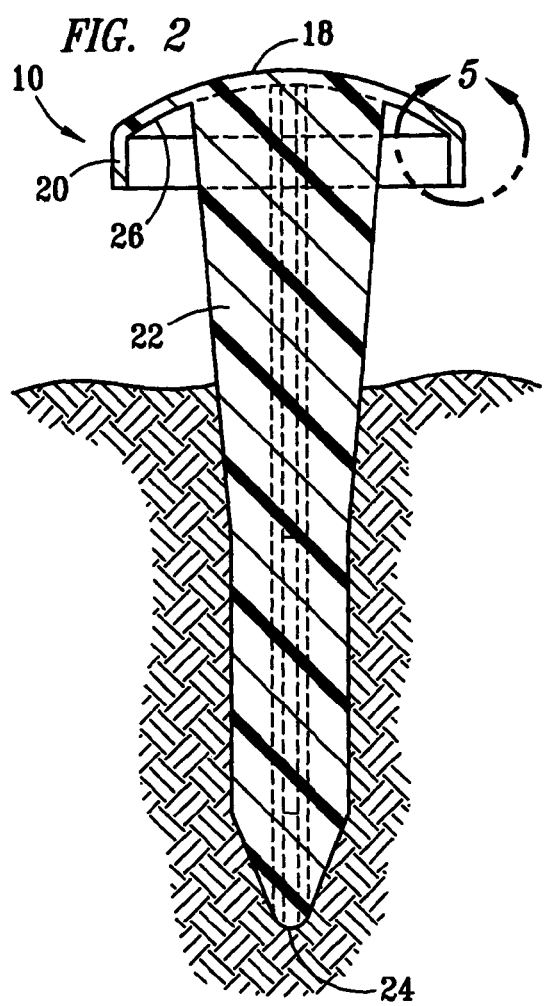
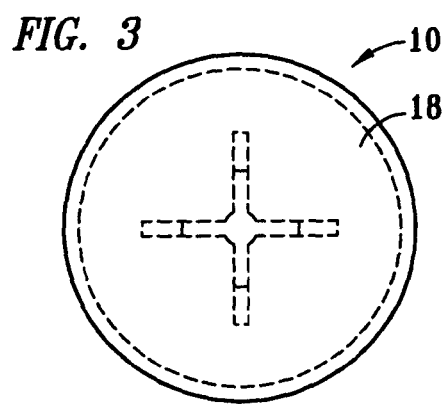
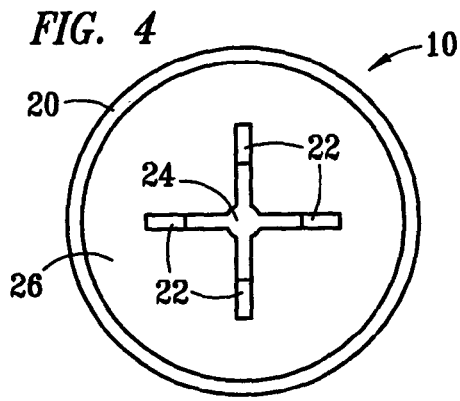
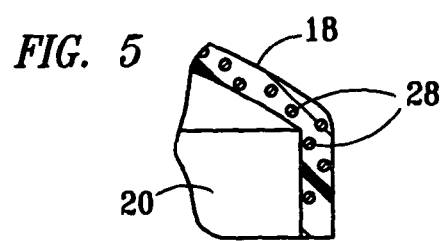

LAWN STAKE WITH CANINE SCENT ATTRACTANT

CROSS-REFERENCE TO RELATED APPLICATIONS

BACKGROUND OF THE INVENTION

1. Field of the Invention

This invention relates to canine care and, more particularly, to a molded plastic article that is useful for influencing dogs to eliminate in a particular outdoor location.

2. Description of Related Art

Dog owners, their neighbors and public park users are well aware of the problems associated with the elimination habits of domestic animals, and more particularly, with canine pets. Although dogs seem to naturally prefer some locations over others as elimination sites, their habits are often unpredictable. This unregulated elimination can cause unsightly "brown spots" and often permanent damage to the landscape. The elimination often results in malodorous and unsanitary elimination in areas used by humans such as on patios, around outdoor furniture and equipment, and in other areas where such problems are particularly objectionable. Also, the repetitive chore of hosing off and cleaning up is greatly simplified if most of the deposits are concentrated in a particular yard location. Various materials and compositions have previously been disclosed for use in influencing pets to eliminate in particular locations.

U.S. Pat. No. 4,263,873, for example, discloses animal litter comprising a pelletized cellulose litter material containing a pheromone-like attractant that makes the litter attractive to animals seeking a place to defecate and/or urinate.

U.S. Pat. No. 5,287,826 discloses a method and kit for modifying the excretory behavior of animals such as dogs by placing β-ionone or related compounds as synergists at particular locations to induce dogs to urinate and defecate preferentially at those locations.

U.S. Pat. No. 5,035,886 discloses a delivery device that releases an active agent over a prolonged time period, the device comprising a microporous material made of ultrahigh molecular weight polymer, finely divided siliceous filler and a network of interconnecting pores in combination with a releasable pheromone or attractant that is associated with the filler. Animal litter and animal flea and tick collars are disclosed as exemplary uses of the subject devices.

U.S. Pat. No. 5,058,533 discloses animal litter and a method of attracting an animal to a particular location for urination and/or defecation comprising the use of rosin oil, the rosin oil preferably containing decarboxylated abietic acid.

U.S. Pat. No. 5,415,131 discloses an improved litter preparation comprising a plurality of preformed and non-toxic liquid absorbing masses of solid matter, each mass comprising a liquid-absorbing substance, at least one releaser pheromone compound which is a biological attractant for the animal, and at least one blending agent.

U.S. Pat. No. 5,914,119 discloses an animal lure and cover scent, preferably for game animals and in the form of an incense stick that comprises a combustible absorbent material carrying the fragrance of urine of the preferred animal. Optionally, the subject sticks can be used in combination with other sticks carrying non-animal fragrance.

U.S. Pat. No. 6,276,300 discloses an animal litter composition comprising paper, sphagnum moss, sawdust, zeolite molecular sieve, and a fragrance that serves as an olfactory cue to dogs for urinating and defecating.

Notwithstanding the attractant products previously disclosed, there remains a need for a device or product that is lightweight, easily handled and installed, that can be made in an unobtrusive or decorative configuration that will not detract appreciably from the appearance of a yard, lawn or park, and that will induce dogs to urinate and defecate at one or more preferred locations on private or public property.

SUMMARY OF THE INVENTION

The invention disclosed herein is preferably made in the form of an article, preferably a lawn or yard stake, that comprises a sufficient quantity of an active ingredient to attract and induce canines to eliminate in the vicinity, most preferably an outdoor area, where the stake is placed. As used herein, the term "eliminate" is understood to include urination and/or defecation. Active ingredients suitable for use in the products of the invention include any nontoxic solid, liquid or gaseous material that can be satisfactorily incorporated into the products in such manner that it will be released over time and cause one or more canines to eliminate in a desired location. The lawn stake of the invention can be made in a shape and color that blend in with lawn grass, or in a contrasting color that is easily visible to both the user and canines. If desired, the subject lawn stake can even be made in a distinctive or decorative color and configuration. Also, while lawn stakes are a preferred form for the products of the invention, the invention can also be made in other forms such as, for example, a form that is conveniently attachable to a fence or other support structure According to one embodiment of the invention, a lawn or yard stake is disclosed that is made of durable, moldable polymeric material and has small particles or microspheres comprising the active ingredient dispersed throughout at least an above-ground portion of the stake, preferably near its surface, so that the active ingredient will be released into the air around the stake for a prolonged period following installation, or will be absorbed by liquid contacting the stake, or both. Liquids contacting the stake might include falling precipitation, water from hoses, lawn sprinklers and the like, or even urine eliminated by a canine.

According to another embodiment of the invention, a lawn stake is disclosed that comprises an above-ground portion having a coating comprising the active ingredient.

According to another embodiment of the invention, a lawn stake is disclosed that comprises a compartment, recess or cavity containing a material comprising the active ingredient. The compartment is desirably vented to the atmosphere to facilitate release and dispersion of the active ingredient. The material comprising the active ingredient can include, for example, a pad, prills, capsules or caplets that are either coated or impregnated with the active ingredient. If desired, the compartment can be provided with a hinged cover or other similarly effective means for confining the material comprising the active ingredient inside the compartment of the subject lawn stake.

According to another embodiment of the invention, a lawn stake is disclosed that comprises active ingredient in gaseous form that is encapsulated within voids inside the stake and is liberated over a prolonged time as it diffuses through the material from which the stake is made.

According to anther embodiment of the invention, at least part of the above-ground portion of the subject lawn stake comprises a porous material that can be impregnated or saturated with an active ingredient, possibly in a liquid form.

Such material can include, for example, wood, woven synthetic or natural fabrics, foamed or unfoamed elastomers, and the like.

According to one embodiment of the invention, the subject lawn stake is disposable following expiration of its effective service life. Alternatively, however, supplemental or replacement materials comprising new or additional active ingredient can be provided for use in replenishing spent active ingredient. The active ingredient can be replenished from a separate bottle or other applicator for use by the pet owner as needed.

Especially where the active ingredient is embodied in a coating or is disposed in one or more compartments within the subject product, it will be appreciated that materials other than polymeric materials can likewise be used in manufacturing the body portion of such products.

The invention disclosed herein offers many advantages over those devices and compositions that have previously been disclosed. Use of the present invention will help confine excreted wastes to a remote or otherwise preferred portion of a yard, will make clean-up easier, and can also aid in housebreaking new pets.

BRIEF DESCRIPTION OF THE DRAWINGS

The apparatus of the invention is further described and explained in relation to the following figures of the drawings wherein:

FIG. 1 is a front elevation view of a preferred embodiment of an attractant-containing plastic article of the invention as inserted into the ground, with the hidden features disposed inwardly of the cap skirt shown in dashed outline;

FIG. 2 is a cross-sectional view taken along line 2—2 of FIG. 1;

FIG. 3 is a top plan view of the article of FIG. 1;

FIG. 4 is a bottom plan view of the article of FIG. 1;

FIG. 5 is an enlarged detail view, partially in cross-section and partially broken away, taken from FIG. 2, showing microspheres of attractant dispersed within the plastic;

DESCRIPTION OF THE PREFERRED EMBODIMENTS

Figure 6:
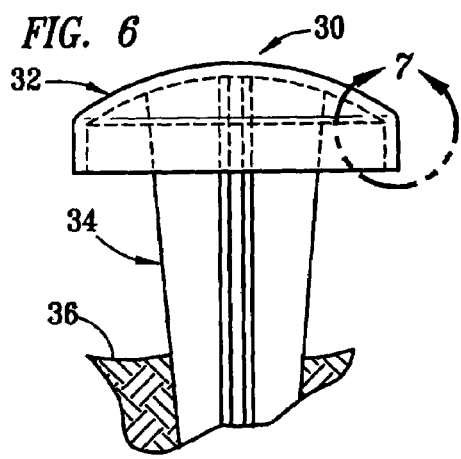
FIG. 6 is a fragmentary front elevation view of a preferred embodiment of an attractant-bearing plastic article of the invention as inserted into the ground, with the hidden features disposed inwardly of the cap skirt shown in dashed outline.

FIGS. 1–4 depict a preferred embodiment of the invention wherein lawn stake 10 has a body in the general shape of a mushroom having a cap portion 12 and a stake portion 14, with stake portion 14 generally simulating a mushroom stem. However, it will be appreciated upon reading this disclosure that the articles of the invention can be similarly made in other utilitarian or decorative shapes and configurations. Cap portion 12 further comprises upwardly facing cap 18 surrounded by depending annular skirt 20, and having downwardly facing cap undersurface 26. A plurality of cooperating elongate and generally tapered ribs 22 extend downwardly from undersurface 26 of cap portion 12 and taper inwardly to form downwardly directed tip 24 and thereby facilitate insertion of stake portion 14 into ground 16. Although four ribs 22 are depicted in the drawings, it is understood that stake portions 14 having different numbers of blades or other cross-sectional configurations are similarly useful in making the articles of the invention.

Moldable polymeric materials such as thermoplastics, fiberglass, nylon and the like, are preferably used in making the articles of the invention. Because injection molding is a preferred method for manufacturing the subject articles, attractant materials that can be incorporated into the polymeric material and withstand the temperatures and pressures of injection molding without degradation or loss of activity are particularly preferred. Although lawn stake 10 is disclosed herein as a unitarily molded article, it is also understood that cap portion 12 and stake portion 14 can be separately made and then attached to each other using any suitable, conventional means.

Referring to FIG. 5, a detail view taken from FIG. 2, a plurality of canine attractant particles 28 are shown as being dispersed relatively evenly throughout the interior of cap 18 and annular skirt 20. According to one embodiment of the invention, particles 28 are microspheres comprising an encapsulated attractant that is released over time and volatilizes off the exposed surfaces of cap portion 12 (FIG. 1) into the surrounding air.

According to another embodiment of the invention, the attractant particles 28 dispersed throughout cap 18 and skirt 20 simply give off an odor that is recognizable to canines and will induce them to eliminate on or in the area nearby lawn stake 10. Although attractant particles 28 are shown as being dispersed only throughout cap portion 12, they can likewise be incorporated into the material from which tapered blades 22 are made. Attractant particles disposed in that part of stake portion 14 that is inserted below the surface of ground 16 may not contribute significantly to attracting canines to the site for elimination except where stakes 10 are used for a prolonged period, during which time sufficient attractant may leach into the surrounding soil to have a beneficial effect.

Attractant materials useful in making the articles of the invention can be provided in solid, granular, prill, powder, gel, liquid or gaseous form, although microspheres comprising the active ingredient or powdered or granular solids having the active ingredient absorbed or adsorbed are generally preferred. Most preferably, the active ingredient is disposed inside or on the surface of small hollow or granular bodies that are blended, calendared or otherwise incorporated into a polymeric material prior to molding lawn stake 10. The attractant materials can also comprise binders, adhesives or other coatings in which solids, particulates or microspheres comprising the active ingredient are dispersed prior to applying them to a body portion of the subject articles.

The canine attractant materials suitable for use in the invention preferably comprise at least one active ingredient capable of inducing canines to eliminate in the vicinity where the active ingredient is sensed by the animal. Particularly preferred active ingredients for use in the subject invention include p-cresyl acetate and phenyl acetic acid.

Figure 7:
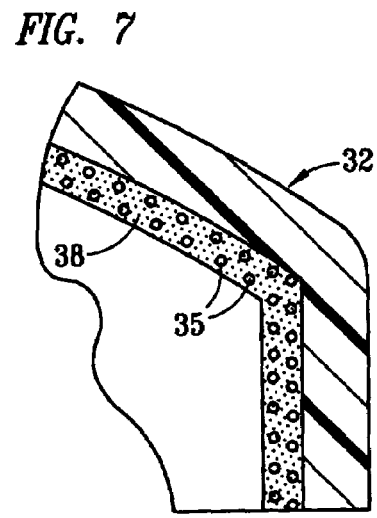
FIG. 7 is a is an enlarged detail view, partially in cross-section and partially broken away, taken from FIG. 6, showing microspheres of attractant dispersed within a layer disposed on the underside of the plastic cap.

Another preferred lawn stake 30 of the invention is described and explained in relation to FIGS. 6 and 7. Lawn stake 30 further comprises a cap portion 32 and stake portion 34, which is depicted in FIG. 6 as being inserted into ground 36. However, unlike the embodiment previously described in relation to FIGS. 2 and 5, lawn stake 30 comprises a continuous coating layer 38 disposed beneath cap portion 32. Continuous coating layer 38 in turn comprises a plurality of dispersed particles 35, each of which is a canine attractant material embodying an active ingredient as described above. The structure and thickness of coating layer 38 is preferably such that dispersed particles 35 can release active ingredient over a prolonged period. When coating layer 38 is applied to the underside of cap portion 32 as depicted in FIG. 7, it is less likely to be washed away by rain, lawn sprinklers and the like. On the other hand, it will be appreciated that coating layer 38 can also be applied to the top of cap portion 32 if it is desired to enhance or accelerate the dispersion of active ingredient contained in particles 35 around lawn stake 30. Coating layer 38 can be applied by dipping, spraying, coextrusion, double-shot injection molding, or by other similarly effective means.

Figure 8:
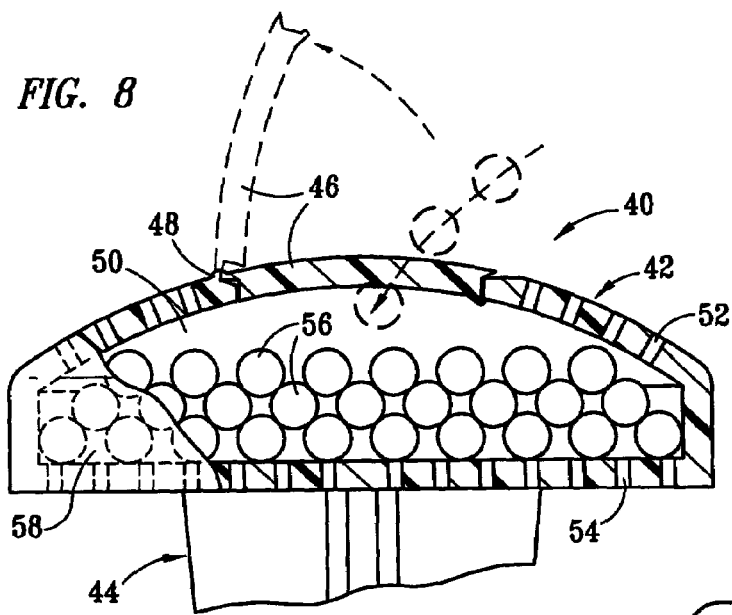
FIG. 8 is a fragmentary front elevation view, partially in cross-section, depicting another preferred embodiment of the invention in which attractant-containing particles are disposed inside a vented cavity within the cap.

Another preferred embodiment of the invention is described in relation to FIG. 8, wherein lawn stake 40 comprising cap portion 42 and stake portion 44 is further provided with an internal cavity 50 containing a plurality of microspheres 56 or other particles comprising an active ingredient that is effective for inducing canines to eliminate in the vicinity where the stake is placed. As shown in FIG. 8, cap portion 42 further comprises a cover 46 attached by hinge member 48. Microspheres 56 are loaded into cavity 50 when cover 46 is elevated to its open position and can be replenished periodically as they are used up or otherwise lose effectiveness. A plurality of spaced-apart vent apertures 52, 54 are desirably provided in the upwardly facing surface of cap portion 42 and in the downwardly facing surface disposed inwardly of circumferentially extending skirt 58, respectively, to facilitate dispersion of active ingredient from the particulate attractant.

Figure 9:
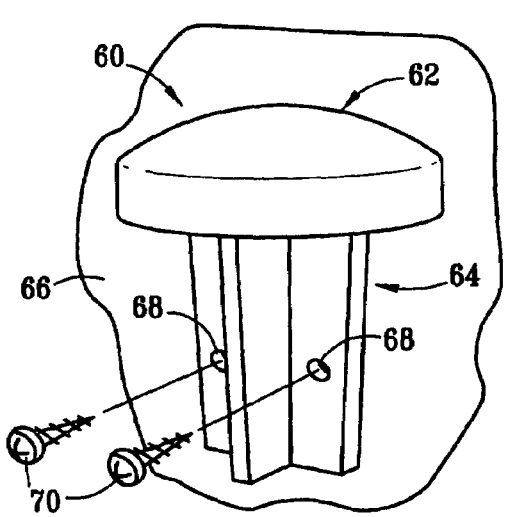
FIG. 9 is a front perspective view, partially exploded, of another preferred embodiment of the invention in which the subject article is made with a flat back and is attachable to a planar support structure by means of releasable fasteners.
Figure 10:
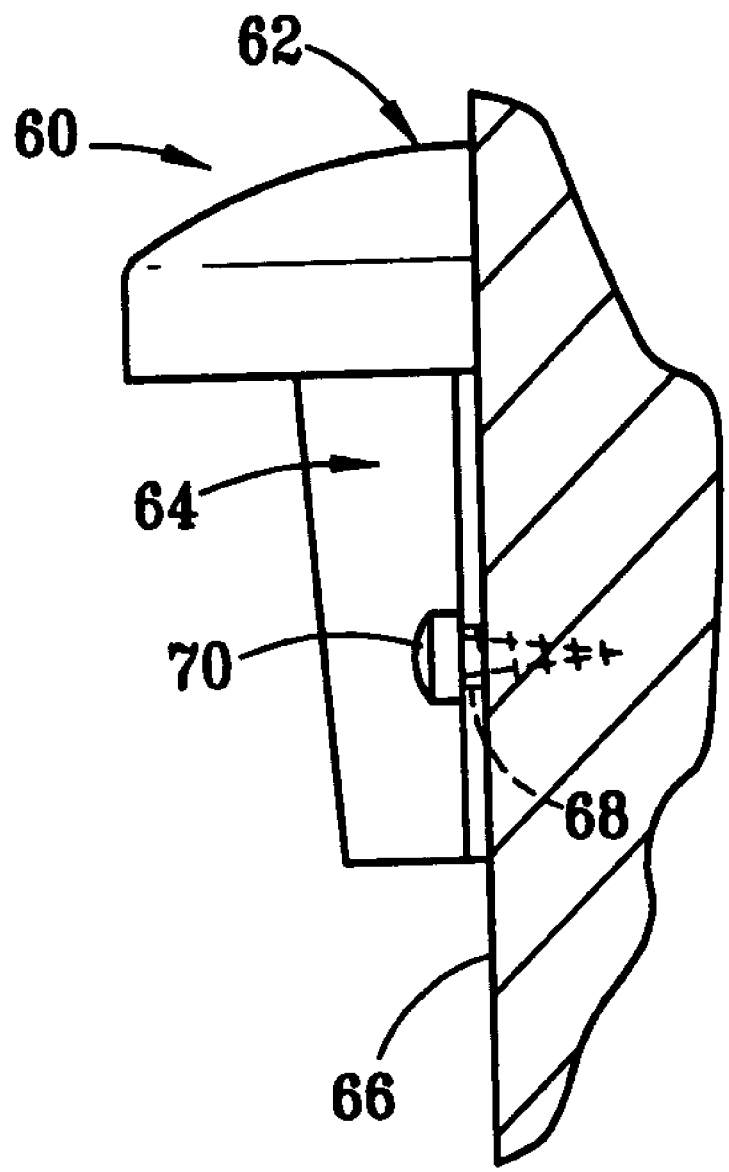
FIG. 10 is a side elevation view of the article of FIG. 9.

Although the articles of the invention are disclosed herein principally in relation to lawn stakes that can be pushed or driven into a lawn or other ground surface, it should be appreciated that the invention can likewise be made in the form of an article that is directly or indirectly attachable to a support structure. Referring to FIGS. 9 and 10, article 60 comprising a cap portion 62 and base member 64 is made, for example, in the same general shape as one side of lawn stakes 10, 30 or 40, but has a substantially planar back side that will facilitate attachment to a wood fence or other support structure 66 by fastener(s) such as screws 70 insertable through apertures 68 in base member 64. The bottom end of base member 64 is truncated to present a visual appearance similar to that of lawn stake 10 (shown in FIG. 1 and previously described) when lawn stake 10 is inserted into the ground. An active ingredient capable of inducing canines to eliminate in the vicinity of article 60 can be incorporated into the subject article in the same manner as for the lawn stakes described above.

The articles of the invention are preferably lightweight and inexpensive to ship, store and handle as compared to the bulky, treated litter products previously known. The articles of the invention can be fabricated to be disposable or reloadable as desired, and will not accumulate in a yard as will a litter-based product that is scattered over a lawn or ground surface.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

The invention claimed is:

1. A yard stake insertable into a ground area, the stake being useful for attracting canines and for inducing the canines to eliminate on the ground area near where the stake is inserted, the stake consisting of a moldable polymeric body having an exposed surface and having dispersed throughout at least a portion of the body a plurality of microspheres, the microspheres further comprising an encapsulated attractant that is released over time and volatilizes off the exposed surface into surrounding air, the encapsulated attractant further comprising an active ingredient selected from the group consisting of p-cresyl acetate and phenyl acetic acid.

2. The yard stake of claim 1 wherein the polymeric body comprises a cap portion and a stake portion.

3. The yard stake of claim 1 wherein the polymeric body is injection molded.

4. The yard stake of claim 3 wherein the polymeric body comprises a plurality of parts that are each injection molded.

5. The yard stake of claim 1 wherein the polymeric body is unitarily molded.

6. The yard stake of claim 1 wherein the polymeric body is moldable from a material selected from the group consisting of thermoplastics, fiberglass and nylon.

* * * * *